(12) United States Patent
Moyal et al.

(10) Patent No.: US 11,743,552 B1
(45) Date of Patent: Aug. 29, 2023

(54) COMPUTER TECHNOLOGY FOR ENHANCING IMAGES WITH A GENERATIVE ADVERSARIAL NETWORK

(71) Applicant: INTERNATIONAL BUSINESS MACHINES CORPORATION, Armonk, NY (US)

(72) Inventors: Shailendra Moyal, Pune (IN); Sarbajit K. Rakshit, Kolkata (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/805,253

(22) Filed: Jun. 3, 2022

(51) Int. Cl.
*H04N 21/647* (2011.01)
*H04N 21/2662* (2011.01)
*G06N 3/045* (2023.01)

(52) U.S. Cl.
CPC ....... *H04N 21/64738* (2013.01); *G06N 3/045* (2023.01); *H04N 21/2662* (2013.01)

(58) Field of Classification Search
CPC ............... G06N 3/045; H04N 21/2662; H04N 21/64738; H04N 21/8456; H04N 19/172; H04N 23/90; G06F 16/248; G06T 4/4046; G06T 4/4053; G06T 5/008; G09B 19/00; G09G 3/2096; H04L 67/12
See application file for complete search history.

(56) References Cited

U.S. PATENT DOCUMENTS

| | | | |
|---|---|---|---|
| 9,883,204 B2 * | 1/2018 | Braness | H04N 21/8456 |
| 10,628,931 B1 | 4/2020 | Ramos | |
| 2007/0180106 A1 | 8/2007 | Pirzada | |
| 2020/0050414 A1 * | 2/2020 | Ilhan | G09G 3/2096 |
| 2021/0118325 A1 * | 4/2021 | Gupta | G09B 19/00 |
| 2021/0255907 A1 * | 8/2021 | Walters | G06F 16/248 |
| 2021/0360154 A1 * | 11/2021 | Slobodin | H04N 23/90 |
| 2022/0172330 A1 * | 6/2022 | Mason | G06T 3/4053 |
| 2022/0263902 A1 * | 8/2022 | Binder | H04L 67/12 |
| 2022/0327657 A1 * | 10/2022 | Zheng | G06T 3/4046 |
| 2022/0385907 A1 * | 12/2022 | Zhang | H04N 19/172 |
| 2023/0067841 A1 * | 3/2023 | Saharia | G06N 3/045 |
| 2023/0112186 A1 * | 4/2023 | Price | G06T 5/008 |
| | | | 382/173 |

OTHER PUBLICATIONS

Andrei, et al., "SUPERVEGAN: Super Resolution Video Enhancement GAN for Perceptually Improving Low Bitrate Streams", IEEE Access, Jun. 18, 2021, 15 pgs., Digital Object Identifier 10.1109/ACCESS.2021.3090344.

(Continued)

*Primary Examiner* — Le H Luu
(74) *Attorney, Agent, or Firm* — David B. Woycechowsky (57) ABSTRACT

Computer technology for use when one or more devices is receiving low resolution video typically due to low internet bandwidth. Multiple devices are chosen for a cluster, with the devices of the cluster being in device to device communication (see definition of "device to device communication" herein). One, or more, of the devices in the cluster is set up to do GAN image enhancement locally for the cluster, and the low resolution video stream is sent to the GAN enhancement device(s) and then enhanced to be sent to other device(s) in the cluster as a higher resolution, clearer video image by device to device communication.

18 Claims, 2 Drawing Sheets

(56) References Cited

OTHER PUBLICATIONS

Brownlee, J., "A Gentle Introduction to Generative Adversarial Networks (GANs)", Generative Adversarial Networks, Jun. 17, 2019, © 2021 Machine Learning Mastery, <https://machinelearningmastery.com/what-are-generative-adversarial-networks-gans/>.

Filho, et al., "A Gan to Fight Video-related Traffic Flooding: Super-Resolution", ResearchGate, Nov. 2019, 7 pgs., DOI: 10.1109/LATINCOM48065.2019.8937966.

Galteri, et al., "Towards Real-Time Image Enhancement GANs", Computer Analysis of Images and Patterns, 18th International Conference, CAIP 2019, Salerno, Italy, Sep. 3-5, 2019, Proceedings, Part I, 12 pgs., DOI: 10.1007/978-3-030-29888-3_15.

Isaksson, M., "Five GANs for Better Image Processing", Towards Data Science, Feb. 20, 2021, 16 pgs., <https://towardsdatascience.com/five-gans-for-better-image-processing-fabab88b370b>.

Jayakodi, et al., "SETGAN: Scale and Energy Trade-of GANs for Image Applications on Mobile Platforms", International Conference on Computer-Aided Design, Nov. 2-5, 2020, Virtual Event, USA, © 2020 Association for Computing Machinery, Mar. 23, 2021, 10 pgs., arXiv:2103.12896v1 [cs.CV].

Sharma, S., "AI Can See Clearly Now: GANs Take the Jitters Out of Video Calls", Nvidi, Oct. 5, 2020, 8 pgs., Copyright © 2022 NVIDIA Corporation, <https://blogs.nvidia.com/blog/2020/10/05/gan-video-conferencing-maxine/>.

\* cited by examiner

COMPUTER TECHNOLOGY FOR ENHANCING IMAGES WITH A GENERATIVE ADVERSARIAL NETWORK

BACKGROUND

The present invention relates to the field of computerized image enhancement and also to the field of generative adversarial networks.

The Wikipedia entry for "Generative Adversarial Network" (as of 19 Apr. 2022) states, in part, as follows: "A generative adversarial network (GAN) is a class of machine learning frameworks . . . Two neural networks contest with each other in a game (in the form of a zero-sum game, where one agent's gain is another agent's loss). Given a training set, this technique learns to generate new data with the same statistics as the training set. For example, a GAN trained on photographs can generate new photographs that look at least superficially authentic to human observers, having many realistic characteristics. Though originally proposed as a form of generative model for unsupervised learning, GANs have also proved useful for semi-supervised learning, fully supervised learning, and reinforcement learning. The core idea of a GAN is based on the 'indirect' training through the discriminator, another neural network that is able to tell how much an input is 'realistic', which itself is also being updated dynamically. This basically means that the generator is not trained to minimize the distance to a specific image, but rather to fool the discriminator. This enables the model to learn in an unsupervised manner . . . GANs can improve astronomical images . . . GANs can denoise welding images by removing the random light reflection on the dynamic weld pool surface . . . . [A] GAN was used for image enhancement focusing on realistic textures rather than pixel-accuracy, producing a higher image quality at high magnification." (footnote(s) omitted)

SUMMARY

According to an aspect of the present invention, there is a method, computer program product and/or system that performs the following operations (not necessarily in the following order): (i) determining a cluster of devices that are in device to device communication with each other; (ii) determining a subset of device(s) of the cluster of devices that is suitable for installation and use of a generative adversarial network (GAN) module for performing image enhancement on a video stream; (iii) installing the GAN module on the subset of devices; (iv) streaming an original streaming video to the subset of device(s) over a wide area network; (v) performing, by the subset of streaming device (s), GAN image enhancement on the original streaming video to obtain an enhanced video stream; and (vi) communicating the enhanced video stream, from the subset of device(s) and to at least one of the device(s) by device to device communication, for display of the enhanced video stream.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
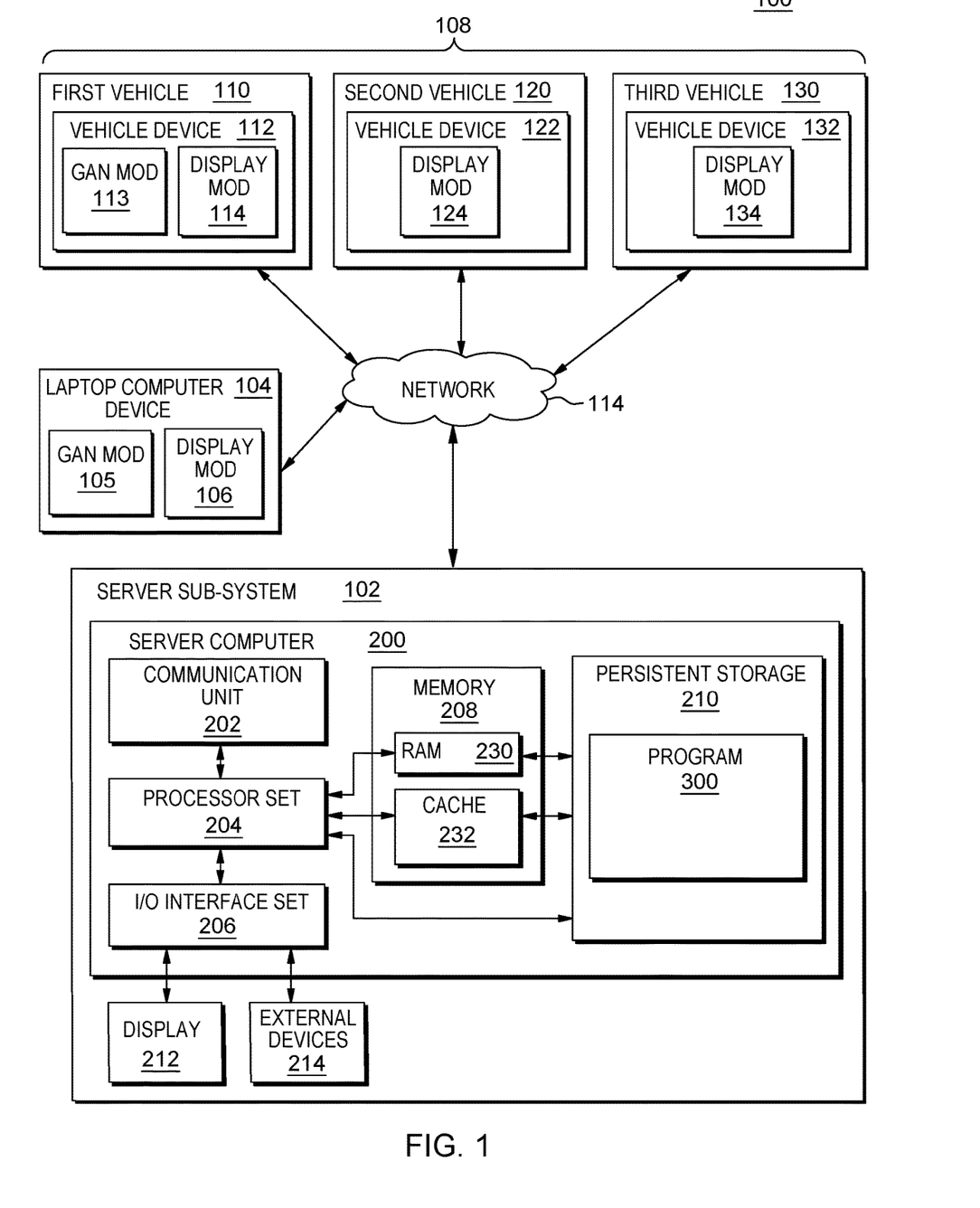
FIG. 1 is a block diagram of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); laptop computer device 104; GAN (generative adversarial network) mod 105; display mod 106; vehicle subsystems 108; first vehicle 110; viewing device 112; GAN mod 113; display mod 114; second vehicle 120; viewing device 122; display mod 124; third vehicle 130; vehicle device 132; display mod 134; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
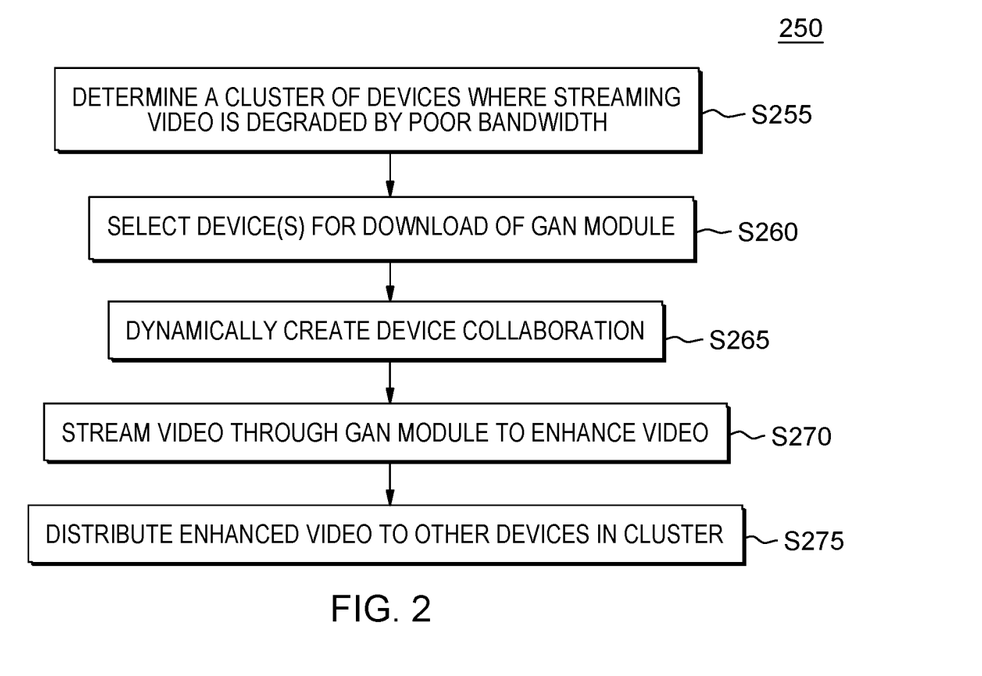
FIG. 2 is a flowchart showing a first embodiment method performed, at least in part, by the first embodiment system.
Figure 3:
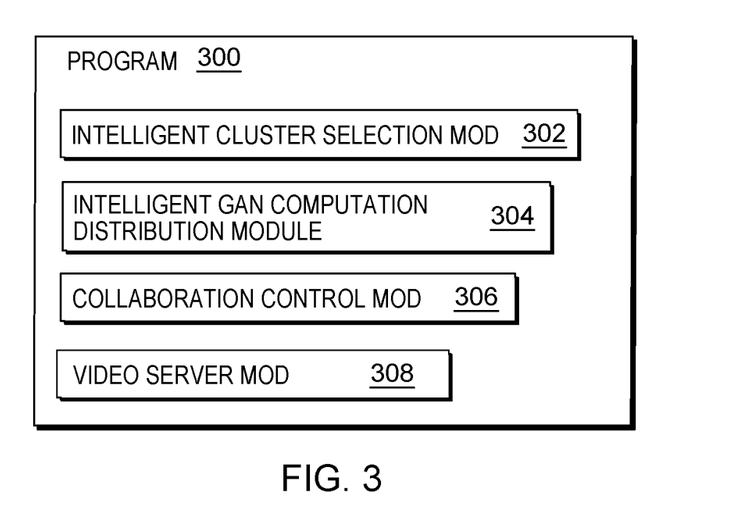
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where intelligent cluster module ("mod") 302 determines a cluster of computer devices to see up with a local GAN, for image enhancement purposes, in case of poor network bandwidth. The devices making up the cluster are chosen by software of mod 302 based on the following criteria: (i) the device is in "device to device communication" with the other devices of the cluster; and (ii) the device is watching or likely to watch the same video and/or the device has the capability to install and run a local GAN for image enhancement purposes.

For purposes of this document, "device to device communication" means that two devices communicate either: (i) directly with each other (for example, through a Bluetooth connection); or (ii) the devices communicate through the hardware of a local area network (for example, through a Wi-Fi router. One type of device to device communication occurs when a device is an edge server if a cloud network so that it can effectively form a local area network with the other devices in the cluster. In some embodiments, the devices will need to authenticate each other, pare, and share the required information.

In this example, the cluster of devices 108 defined by mod 302 is made up of vehicle device 112 (located in first vehicle 110); vehicle device 122 (located in second vehicle 120; and vehicle device 132 (located in vehicle 130. In this example, the vehicles are travelling convoy style down a highway. The first vehicle device acts as a Wi-Fi hotspot for device to device communication among and between the devices of cluster 108. The first vehicle device is very powerful with respect to memory and processing power. The second and third vehicle devices are chosen for the cluster because they are in device to device communication with the first vehicle device and further because the second and third vehicle devices are watching the same video (in this example, a three hour movie). There are typically distance limits on device to device type communication. For example, Bluetooth communication connections can typically support about 10 meters of distance between communicating devices. Wi-Fi, as used in this example, typically has distance limits on the order of 100 meters.

Processing proceeds to operation S260, where intelligent GAN distribution mod 304 determines which device on which GAN module 113 should be installed. In some embodiments, this may require the selected device to install an app so that the GAN module may be installed. In some embodiments, the GAN mod may be installed on multiple devices in the cluster. In some embodiments, the GAN mod may be distributed over multiple devices so that the thermal, computational and/or memory burdens imposed by running the image enhancement provided by the GAN can be distributed over multiple devices. In this example, GAN mod 113 is installed on a single device, specifically vehicle device 112 located in first vehicle 110.

MEMORY DISTRIBUTION. In this example, mod 304 selects vehicle device 112 in part because it has far more memory available than the other devices in the cluster. In some embodiments, the available memory may be monitored over time so that the GAN module (or portions thereof) can be moved among and between devices of the cluster so that available memory will cause the GAN mod to dynamically move to the device of the cluster that has the most available memory at any given time. The participating devices in any surrounding (where GAN will be processed) collaborate with each other (Device to Device computation) to form a device to device computing ecosystem. The aggregated computing capacity aggregates the available resources in different devices in their surroundings. Once the devices collaborate with each other using Device to Device communication, an Edge computing ecosystem will be created. The devices share their resources for edge executing GAN where it will identify which devices have how many resources to execute GAN, and accordingly, distribute the load among multiple devices to satisfy the required computation load.

THERMAL CONSIDERATIONS. In this example, mod 304 selects vehicle device 112 in part because it better heat dissipation characteristics than the other devices in the cluster. In some embodiments, the device temperatures may be monitored over time so that the GAN module (or portions thereof) can be moved among and between devices of the cluster so that thermal considerations will cause the GAN mod to dynamically move to the device of the cluster that is running the coolest at any given time. GAN module (software to process data for GAN) will be installed in the participating devices. The devices collaborate with each other and distribute the data among the devices based on the available computing resources, and aggregate the same to complete the image enhancement in participation of multiple devices.

Processing proceeds to operation S265, where collaboration control mod 306 dynamically creates device collaboration so that the devices 122, 132 in cluster 108 can receive the GAN-enhanced video stream from vehicle device 112 when network bandwidth is determined to be low, such that the image can be improved by GAN enhancement. At this point in time, network bandwidth is not low, so vehicle devices 122 and 132 are directly receiving the video stream of the three hour movie from video server mod 308 through network 114. It is noted that this streaming is not through device to device communication because network 114 is a wide area network (specifically, the internet).

Processing proceeds to operation S270, where mod 306 receives an indication that network bandwidth has become low such that vehicle devices 122, 132 are now receiving and displaying a degraded image. In response to this indication, mod 306 causes video server mod 308 to start streaming the video to vehicle device 112 (for GAN image enhancement with GAN mod 113), and to stop streaming the video to vehicle devices 122, 132. The GAN enhanced video will typically have a higher video resolution than the degraded low bandwidth signal received through network 114, so the device to device communication within the cluster becomes important because it is not effected by the low bandwidth operation of network 114 through which the original, unenhanced video stream is received.

Processing proceeds to operation S275, where GAN mod 113 receives the streaming video through network 114 (that is, through non device to device communication), enhances it, and then sends a GAN-enhanced by device to device communication to vehicle device 122 for display on display mod 124 and also to vehicle device 132 for display on display mod 134. As mentioned above, the device to device communication, in this example, is in the form of Wi-Fi hotspot through which the devices of cluster 108 can communicate while avoiding the network bandwidth issue that has come to affect communications made through network 114. In this way, system 100 will brings among the devices of cluster 108, and cluster wise GAN will be executed.

As time passes and vehicles 110, 112 and 113 travel on the roads, the identity of the devices in the cluster may be dynamically and intelligently adjusted. For example, the vehicles may move into the vicinity of laptop computer device 104, equipped with GAN mod 105, so that device 104 is added to the cluster, and added to the Wi-Fi hotspot, and GAN mod 105 performs, or helps perform, GAN image enhancement based upon estimated thermal effects, free memory levels and/or processing power.

The method described above effectively manages the GAN execution, for example. If a device does not have enough resources to execute GAN, so, it will introduce latency to get GAN based image enhancement in poor network, or if nearby devices can be found to execute edge computation so that GAN execution latency can be reduced.

III. Further Comments and/or Embodiments

Generative Adversarial Networks (GANs) are being used for enhancement of images. Generative modeling is an unsupervised learning task utilizing machine learning that involves automatically discovering and learning the regularities or patterns in input data in such a way that the model can be used to generate and output new examples that plausibly could have been drawn from the original dataset. In poor network bandwidth environments, scaled down images and/or low resolution images are shown, especially when streaming video or images are shown. This degrades the viewing experience of the images. There is a need for a better user experience in poor network bandwidth environments.

Some embodiments of the present invention may include one, or more, of the following operations, features, characteristics and/or advantages: (i) based on a predicted poor network bandwidth environment, while accessing streaming video content, proactively install GAN modules in local computing device; (ii) if a poor network bandwidth environment exists, poor image quality can be addressed by the locally downloaded and installed GAN module when using a mobile devices; (iii) analyze the devices specifications, available computing resources in different devices, and accordingly create an edge computing ecosystem to: (a) execute GAN modules, and (b) thereby enhance the image quality locally when consuming streaming video where there is poor network bandwidth; (iv) estimate aggregated heat generation from different devices while executing edge GAN modules; and/or (v) identify the optimum balance between network bandwidth availability and a viewing device's processing capability and execute GAN modules locally to selectively improve quality of the images when appropriate.

Some embodiments of the present invention may include one, or more, of the following operations, features, characteristics and/or advantages: (i) determine current image quality based on available internet bandwidth, (ii) estimate how much computing resources will be required locally; (iii) close unused services in different devices so that the required computing resources can be made available; (iv) in any multi-device physical ecosystem, if the devices are known to each other, then the devices will be collaborating with each other to identify if he same or different media contents are being consumed; (v) the devices are be clustered in such a way that the cluster wise GAN module executes on the video stream to enhance the image quality locally; and/or (vi) the system makes use of historical learning about network bandwidth availability and eco-system needs of the edge computing and uses these for advance preparation of the GAN enabled image quality improvements based on predicted data analysis.

Some embodiments of the present invention may include one, or more, of the following operations, features, characteristics and/or advantages: (i) based on the mobility path in any poor network bandwidth environment (for example, vehicles), if the media contents are being consumed, then the vehicle(s) will cluster in such a way that the media content wise GAN network will be created so that the images can be enhanced locally; and/or (ii) the clustering can be: (a) applied to a mobility path of an individual in a building or home ecosystem, and (b) a cluster of devices can be created in a way that a media content-based GAN network will be created.

According to some embodiments of the present invention, the system: (i) estimates poor network bandwidth availability; (ii) the GAN module will proactively be installed in the devices so that the image quality can be enhanced locally; (iii) streams media with poor network bandwidth to a cloud environment where the devices are individually consuming media with poor bandwidth; and (iv) identifies devices that can collaborate to enhance the image locally.

A method according to an embodiment of the present invention includes the following operations (not necessarily in the following order): (i) each and every computing device in a cluster will share the available resources with a cloud server, which can be utilized for image correction with GAN; (ii) in a poor network bandwidth availability environment, the pixel density of the images in each image frame will be reduced and this reduces the image quality, so accordingly, estimate and predict poor network bandwidth in any surrounding; (iii) identify the shortage of internet bandwidth caused by multiple connections and also by poor network bandwidth from the source; (iv) estimate how long the internet bandwidth will be poor; and (v) estimate where the internet bandwidth will be poor.

A method according to an embodiment of the present invention includes the following operations (not necessarily in the following order): (i) predict poor quality of the streaming media on the devices and which ones needs to be corrected; (ii) based on the internet bandwidth availability, estimate the pixel density with the images or image sequences; (iii) estimate how much computing resources will be required to enhance the images locally on near a real-time basis; (iv) proactively download GAN modules on the mobile devices so that the images can be enhanced locally; and (v) identify whether a single device is sufficient or multiple devices will be required.

A method according to an embodiment of the present invention includes the following operations (not necessarily in the following order): (i) create an edge computing ecosystem to execute the GAN module and enhance the images locally; (ii) once the GAN modules are installed in one or more devices, then the devices participate to enhance the image quality locally; (iii) identify when the network bandwidth falls below a threshold, such that video resolution will become poor; (iv) identify if the image quality is reduced based on the user's experience; (v) the GAN module installed locally will execute and enhance the images for the user; and (vi) based on the device capacity, performance, estimate heat generation while executing the GAN modules.

A method according to an embodiment of the present invention includes the following operations (not necessarily in the following order): (i) based on estimated aggregated heat generation, identify which devices should participate to execute GAN modules locally so that aggregated heat generation is minimum; (ii) identify if other services are also utilizing the memory to execute the GAN module and if the services are required; (iii) identify which services are to be stopped so that the devices can provide the required computing resources; (iv) if the streaming media is to be accessed during mobility in any poor network bandwidth environment, then based on the appropriate permission provided by the passenger, the devices respectively located in multiple vehicles will collaborate; and (v) the vehicles will cluster in such a way that it can create an edge computing ecosystem and collaboratively execute GAN modules to improve streaming video image quality on device(s) where streaming video quality would otherwise be poor due to low bandwidth.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v)

located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) comprising:
    determining a cluster of devices that are in device to device communication with each other;
    determining a subset of devices of the cluster of devices that is suitable for installation and use of a generative adversarial network (GAN) module for performing image enhancement on a video stream;
    installing the GAN module on the subset of devices;
    streaming an original streaming video to the subset of devices over a wide area network;
    performing, by the subset of streaming devices, GAN image enhancement on the original streaming video to obtain an enhanced video stream; and
    communicating the enhanced video stream, from the subset of devices and to at least one of the devices by device to device communication, for display of the enhanced video stream.

2. The CIM of claim 1 wherein the device to device communication is by Wi-Fi.

3. The CIM of claim 1 wherein the device to device communication is by Bluetooth.

4. The CIM of claim 1 wherein the subset of devices is a single device which is an edge device.

5. The CIM of claim 1 wherein the determination of the subset of devices is based, at least in part, on available memory considerations.

6. The CIM of claim 1 wherein the determination of the subset of devices is based, at least in part, on thermal considerations.

7. A computer program product (CPP) comprising:
    a set of storage devices; and
    computer code stored collectively in the set of storage devices, with the computer code including data and instructions to cause a processors set to perform at least the following operations:
        determining a cluster of devices that are in device to device communication with each other,
        determining a subset of devices of the cluster of devices that is suitable for installation and use of a generative adversarial network (GAN) module for performing image enhancement on a video stream,
        installing the GAN module on the subset of devices,
        streaming an original streaming video to the subset of devices over a wide area network,
        performing, by the subset of streaming devices, GAN image enhancement on the original streaming video to obtain an enhanced video stream, and
        communicating the enhanced video stream, from the subset of devices and to at least one of the devices by device to device communication, for display of the enhanced video stream.

8. The CPP of claim 7 wherein the device to device communication is by Wi-Fi.

9. The CPP of claim 7 wherein the device to device communication is by Bluetooth.

10. The CPP of claim 7 wherein the subset of devices is a single device which is an edge device.

11. The CPP of claim 7 wherein the determination of the subset of devices is based, at least in part, on available memory considerations.

12. The CPP of claim 7 wherein the determination of the subset of devices is based, at least in part, on thermal considerations.

13. A computer system (CS) comprising:
    a processors set including one or more processors;
    a set of storage devices; and
    computer code stored collectively in the set of storage devices, with the computer code including data and instructions to cause the processors set to perform at least the following operations:
        determining a cluster of devices that are in device to device communication with each other,
        determining a subset of devices of the cluster of devices that is suitable for installation and use of a generative adversarial network (GAN) module for performing image enhancement on a video stream,
        installing the GAN module on the subset of devices,
        streaming an original streaming video to the subset of devices over a wide area network,
        performing, by the subset of streaming devices, GAN image enhancement on the original streaming video to obtain an enhanced video stream, and
        communicating the enhanced video stream, from the subset of devices and to at least one of the devices by device to device communication, for display of the enhanced video stream.

14. The CS of claim 13 wherein the device to device communication is by Wi-Fi.

15. The CS of claim 13 wherein the device to device communication is by Bluetooth.

16. The CS of claim 13 wherein the subset of devices is a single device which is an edge device.

17. The CS of claim 13 wherein the determination of the subset of devices is based, at least in part, on available memory considerations.

18. The CS of claim 13 wherein the determination of the subset of devices is based, at least in part, on thermal considerations.

* * * * *